United States Patent
Fujisaki et al.

(10) Patent No.: US 10,903,502 B2
(45) Date of Patent: Jan. 26, 2021

(54) ELECTROCHEMICAL CELL

(71) Applicant: NGK INSULATORS, LTD., Nagoya (JP)

(72) Inventors: Shinji Fujisaki, Kuwana (JP); Takashi Ryu, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/909,268

(22) Filed: Jun. 23, 2020

(65) Prior Publication Data

US 2020/0321628 A1 Oct. 8, 2020

Related U.S. Application Data

(63) Continuation of application No. PCT/JP2020/000556, filed on Jan. 10, 2020.

(30) Foreign Application Priority Data

Jan. 30, 2019 (JP) .................................. 2019-014746

(51) Int. Cl.
*H01M 4/90* (2006.01)
*H01M 8/12* (2016.01)

(52) U.S. Cl.
CPC ........... *H01M 4/9033* (2013.01); *H01M 8/12* (2013.01)

(58) Field of Classification Search
CPC combination set(s) only.
See application file for complete search history.

(56) References Cited

U.S. PATENT DOCUMENTS

| | | | |
|---|---|---|---|
| 2013/0244132 A1* | 9/2013 | Ohmori | B01J 23/002 429/482 |
| 2018/0131007 A1 | 5/2018 | Fujisaki et al. | |
| 2019/0088968 A1 | 3/2019 | Fujisaki et al. | |

FOREIGN PATENT DOCUMENTS

| JP | 8180885 A | 7/1996 |
|---|---|---|
| JP | 200632132 A | 2/2006 |

(Continued)

OTHER PUBLICATIONS

International Search Report with English Translation issued in corresponding International Application No. PCT/JP2020/000556 dated Mar. 31, 2020 (6 pages).

(Continued)

*Primary Examiner* — Wyatt P McConnell
(74) *Attorney, Agent, or Firm* — Flynn Thiel, P.C.

(57) ABSTRACT

An electrochemical cell includes a fuel electrode, an air electrode containing a perovskite type oxide as a main component, the perovskite type oxide being represented by a general formula $ABO_3$ and containing La and Sr at the A site, and a solid electrolyte layer arranged between the fuel electrode and the air electrode. The air electrode includes a center portion and an outer peripheral portion, the center portion being located at a center of the air electrode in a plane direction perpendicular to a thickness direction of the air electrode, the outer peripheral portion surrounding the center portion in the plane direction. A first ratio of an La concentration to an Sr concentration detected at the outer peripheral portion through Auger electron spectroscopy is at least 1.1 times a second ratio of an La concentration to an Sr concentration detected at the center portion through Auger electron spectroscopy.

3 Claims, 1 Drawing Sheet

(56) References Cited

FOREIGN PATENT DOCUMENTS

| | | |
|---|---|---|
| JP | 2012119212 A | 6/2012 |
| WO | 2017006943 A1 | 1/2017 |
| WO | 2018021484 A1 | 2/2018 |
| WO | 2018021490 A1 | 2/2018 |

OTHER PUBLICATIONS

Written Opinion of International Searching Authority with English Translation issued in corresponding International Application No. PCT/JP2020/000556 dated Mar. 31, 2020 (6 pages).

* cited by examiner

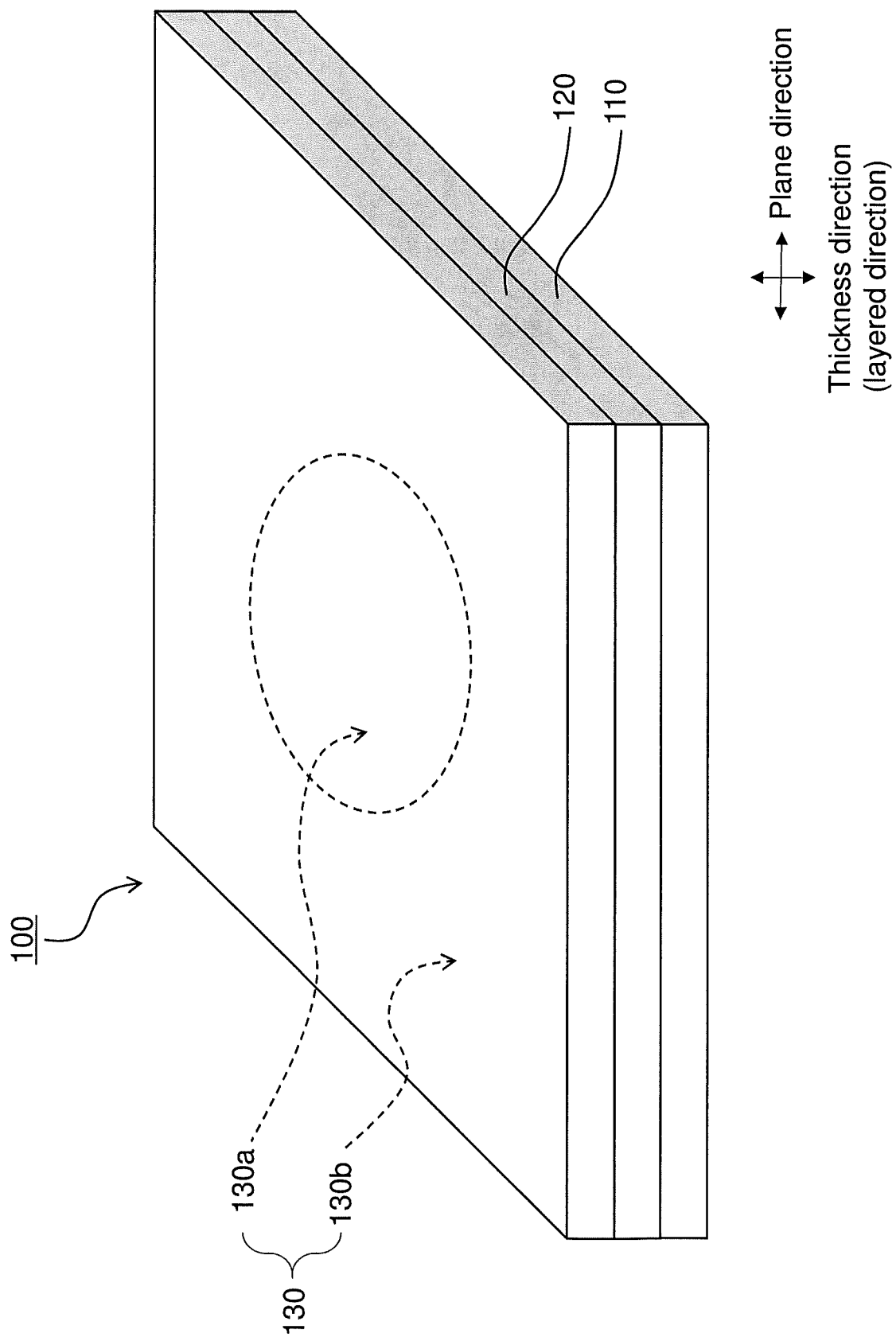

ELECTROCHEMICAL CELL

This is a continuation of PCT/JP2020/000556, filed Jan. 10, 2020, which claims priority to Japanese Application No. 2019-014746, filed Jan. 30, 2019, the entire contents of which are hereby incorporated by reference.

TECHNICAL FIELD

The present invention relates to an electrochemical cell.

BACKGROUND ART

In recent years, fuel cells, which are one type of electrochemical cells, are attracting attention from standpoint of environmental problems and effective utilization of energy resources. Fuel cells commonly include a fuel electrode, an air electrode, and a solid electrolyte layer that is arranged between the fuel electrode and the air electrode.

Perovskite type oxides, which are represented by a general formula $ABO_3$ and contain La (lanthanum) and Sr (strontium) at an A site, are preferable for the air electrode (see JP 2006-32132A, for example).

Examples of such perovskite type oxides include (La, Sr)(Co, Fe)$O_3$, (La, Sr) Fe$O_3$, (La, Sr)Co$O_3$, and (La, Sr)Mn$O_3$.

SUMMARY

Technical Problem

However, output of a fuel cell may decrease as a result of power generation being repeated. Inventors of the present invention newly found that a reduction in the output is caused by deterioration of the air electrode, and one cause of the deterioration of the air electrode is formation of a compound by La contained in the air electrode and B (boron). Note that B comes to the air electrode by flying from a member located in a surrounding region, such as a support portion that supports the fuel cell.

An object of the present invention is to provide an electrochemical cell with which a reduction in output can be suppressed.

Solution to Problem

An electrochemical cell according to the present invention includes a fuel electrode, an air electrode containing a perovskite type oxide as a main component, the perovskite type oxide being represented by a general formula $ABO_3$ and containing La and Sr at the A site, and a solid electrolyte layer arranged between the fuel electrode and the air electrode. The air electrode includes a center portion and an outer peripheral portion, the center portion being located at a center of the air electrode in a plane direction perpendicular to a thickness direction of the air electrode, the outer peripheral portion surrounding the center portion in the plane direction. A first ratio of an La concentration to an Sr concentration detected at the outer peripheral portion through Auger electron spectroscopy is at least 1.1 times a second ratio of an La concentration to an Sr concentration detected at the center portion through Auger electron spectroscopy.

Advantageous Effects

According to the present invention, it is possible to provide an electrochemical cell with which a reduction in output can be suppressed.

BRIEF DESCRIPTION OF DRAWINGS

The Figure is a perspective view showing a configuration of a fuel cell according to an embodiment.

DESCRIPTION OF EMBODIMENTS

Configuration of Fuel Cell 100

A configuration of a fuel cell 100, which is one example of an electrochemical cell according to the present embodiment, will be described with reference to the accompanying drawing. The Figure is a perspective view of the fuel cell 100.

The fuel cell 100 is a so-called solid oxide fuel cell (SOFC: Solid Oxide Fuel Cell). The fuel cell 100 may be of various types such as a flat-tubular type, segmented-in-series type, a flat plate type, and a cylindrical type.

The fuel cell 100 includes a fuel electrode 110, a solid electrolyte layer 120, and an air electrode 130. Although there is no particular limitation on the shape of the fuel cell 100, the fuel cell 100 can have a square or rectangular plate shape having sides with a length of 10 to 300 mm, for example.

In the fuel cell 100, power is generated based on the following chemical reaction formulas (1) and (2) as a result of a fuel gas (e.g., hydrogen) being supplied to the fuel electrode 110 and an oxidant gas (e.g., air) being supplied to the air electrode 130.

$$(½).O_2 + 2e^- \rightarrow O^{2-} \text{ (in the air electrode 130)} \quad (1)$$

$$H_2 + O^{2-} \rightarrow H_2O + 2e^- \text{ (in the fuel electrode 110)} \quad (2)$$

The fuel electrode 110 is a porous body having good gas permeability. The fuel electrode 110 functions as an anode of the fuel cell 100. The fuel electrode 110 is constituted by a substance that has electron conductivity and a substance that has oxygen ion conductivity. The fuel electrode 110 can be constituted by NiO-8YSZ (yttria stabilized zirconia) or NiO-GDC (gadolinium doped ceria), for example. Although there is no particular limitation on the thickness of the fuel electrode 110, the fuel electrode 110 can have a thickness of 50 to 2000 μm, for example. Although there is no particular limitation on the porosity of the fuel electrode 110, the fuel electrode 110 can have a porosity of 15 to 55%, for example.

The solid electrolyte layer 120 is arranged between the fuel electrode 110 and the air electrode 130. The solid electrolyte layer 120 is a compact body through which oxygen ions generated in the air electrode 130 can permeate. The solid electrolyte layer 120 functions as a seal film that prevents a fuel gas (e.g., hydrogen gas) from being mixed with an oxygen-containing gas (e.g., air).

The solid electrolyte layer 120 may contain $ZrO_2$ (zirconia) as a main component. The solid electrolyte layer 120 may also contain additives such as $Y_2O_3$ (yttria) and/or $Sc_2O_3$ (scandium oxide), in addition to zirconia. These additives function as stabilizers. A molar composition ratio of stabilizers to zirconia (stabilizers:zirconia) in the solid electrolyte layer 120 can be set to about 3:97 to 20:80. Accordingly, examples of materials of the solid electrolyte layer 120 include 3YSZ, 8YSZ, 10YSZ, and ScSZ (zirconia stabilized with scandia). The solid electrolyte layer 120 can have a thickness of 3 μm to 50 μm, for example. Although there is no particular limitation on the porosity of the solid electrolyte layer 120, the solid electrolyte layer 120 can have a porosity of 0 to 10%, for example.

The air electrode 130 is a porous body having good gas permeability. The air electrode 130 functions as a cathode of the fuel cell 100. The air electrode 130 can have a square or rectangular plane shape (external shape in a plan view).

The air electrode 130 contains, as a main component, a perovskite type oxide that is represented by a general formula $ABO_3$ and contains La (lanthanum) and Sr (strontium) at the A site. Examples of such perovskite type oxides include, but are not limited to, (La, Sr) (Co, Fe)$O_3$ (lanthanum strontium cobalt ferrite), (La, Sr)Fe$O_3$ (lanthanum strontium ferrite), (La, Sr)Co$O_3$ (lanthanum strontium cobaltite), and (La, Sr)Mn$O_3$ (lanthanum strontium manganate). Although there is no particular limitation on the thickness of the air electrode 130, the air electrode 130 can have a thickness of 50 to 2000 μm, for example. Although there is no particular limitation on the porosity of the air electrode 130, the air electrode 130 can have a porosity of 15 to 55%, for example.

In the present embodiment, a substance Y "being contained as a main component" in a composition X means that the substance Y constitutes at least 70 weight % of the entire composition X.

As shown in the Figure, the air electrode 130 includes a center portion 130a and an outer peripheral portion 130b.

The center portion 130a is located at the center of the air electrode 130 in a plane direction that is perpendicular to a thickness direction. The thickness direction is the same as a direction in which the fuel electrode 110, the solid electrolyte layer 120, and the air electrode 130 are layered. In the example shown in the Figure, the center portion 130a has a circular plane shape, but the center portion 130a may also have an elliptical, rectangular, polygonal, or indeterminate plane shape. Although there is no particular limitation on a plane size of the center portion 130a, the center portion 130a can have a plane size that is at least 5% and not larger than 50%, and preferably at least 10% and not larger than 30% of the entire plane area of the air electrode 130.

The outer peripheral portion 130b surrounds the center portion 130a in the plane direction. The outer peripheral portion 130b is a portion of the air electrode 130 other than the center portion 130a. The plane shape and the plane size of the outer peripheral portion 130b are set according to the plane shape and the plane size of the center portion 130a. The outer peripheral portion 130b may also be formed as a single piece together with the center portion 130a. That is, the center portion 130a and the outer peripheral portion 130b need not have a boundary therebetween.

La/Sr Ratio at Air Electrode 130

A first ratio (La concentration/Sr concentration) Qb of a quantitative value of La (hereinafter referred to as an "La concentration") to a quantitative value of Sr (hereinafter referred to as an "Sr concentration") detected at the outer peripheral portion 130b through Auger electron spectroscopy is at least 1.1 times a second ratio (La concentration/Sr concentration) Qa of an La concentration to an Sr concentration detected at the center portion 130a through Auger electron spectroscopy. That is, $Qb \geq 1.1 \times Qa$.

With this configuration, a composition ratio of La at the outer peripheral portion 130b can be made sufficiently higher than a composition ratio of La at the center portion 130a to cause B (boron) to preferentially react with La contained in the outer peripheral portion 130b during electric conduction. As a result of B being trapped by La contained in the outer peripheral portion 130b as described above, B can be kept from reacting with La in the center portion 130a and forming a compound. Accordingly, a reduction in catalyst reaction activity at the center portion 130a can be suppressed, and deterioration of the air electrode 130 as a whole can be suppressed. As a result, a reduction in output of the fuel cell 100 can be suppressed.

The first ratio Qb at the outer peripheral portion 130b is preferably not larger than 1.6 times the second ratio Qa at the center portion 130a. This configuration can reduce a difference in reaction activity between the center portion 130a and the outer peripheral portion 130b during electric conduction, and accordingly can suppress local deterioration of the air electrode 130 due to generation of a current density distribution. The first ratio Qb at the outer peripheral portion 130b is more preferably not larger than 1.3 times the second ratio Qa at the center portion 130a.

Although there is no particular limitation on a numerical value range of the first ratio Qb at the outer peripheral portion 130b, the first ratio Qb is preferably at least 0.25 and not larger than 0.55, for example. Although there is no particular limitation on a numerical value range of the second ratio Qa at the center portion 130a, the second ratio Qa is preferably at least 0.18 and not larger than 0.4, for example. With this configuration, deterioration of the air electrode can be further suppressed.

The following describes a method for determining the first ratio Qb at the outer peripheral portion 130b and the second ratio Qa at the center portion 130a.

First, middle points of four sides defining an outer edge of the air electrode 130 are determined in a plan view. Next, an intersection point between a straight line that connects middle points of two opposite sides and a straight line that connects middle points of the remaining two opposite sides is determined as the center. Next, with respect to each line segment extending from the center to each middle point, a position located at a distance of ¾ of the entire length of the line segment from the center is determined as a first measurement point (a total of four points) for calculating the first ratio Qb. Also, with respect to each line segment extending from the center to each middle point, a position located at a distance of ¼ of the entire length of the line segment from the center is determined as a second measurement point (a total of four points) for calculating the second ratio Qa.

Next, La intensity data and Sr intensity data are obtained for each of the four first measurement points using a scanning Auger electron spectroscopy apparatus (manufactured by ULVAC-PHI, Inc., Model-710, electron beam acceleration voltage: 10 kV). Next, an La concentration is determined for each first measurement point by dividing the La intensity data by an La relative sensitivity factor, and an Sr concentration is determined for each first measurement point by dividing the Sr intensity data by an Sr relative sensitivity factor. Next, a mean La concentration is determined by calculating an arithmetic mean of the La concentrations of the four first measurement points, and a mean Sr concentration is determined by calculating an arithmetic mean of the Sr concentrations of the four first measurement points. Then, a value obtained by dividing the mean La concentration by the mean Sr concentration is taken to be the first ratio Qb.

Similarly, La intensity data and Sr intensity data are obtained for each of the four second measurement points using the scanning Auger electron spectroscopy apparatus (manufactured by ULVAC-PHI, Inc., Model-710, electron beam acceleration voltage: 10 kV). Next, an La concentration is determined for each second measurement point by dividing the La intensity data by the La relative sensitivity factor, and an Sr concentration is determined for each second measurement point by dividing the Sr intensity data by the Sr relative sensitivity factor. Next, a mean La concentration is determined by calculating an arithmetic mean of the La concentrations of the four second measurement points, and a mean Sr concentration is determined by calculating an arithmetic mean of the Sr concentrations of the four second measurement points. Then, a value obtained by dividing the mean La concentration by the mean Sr concentration is taken to be the second ratio Qa.

Note that the La relative sensitivity factor and the Sr relative sensitivity factor are determined according to the electron beam acceleration voltage of the scanning Auger electron spectroscopy apparatus. If the electron beam acceleration voltage is 10 kV, the La relative sensitivity factor is 0.652 and the Sr relative sensitivity factor is 0.059.

Method for Manufacturing Fuel Cell 100

A method for manufacturing the fuel cell 100 will be described.

First, a slurry is prepared by mixing a mixed powder (e.g., a mixture of an NiO powder and an YSZ powder) for forming the fuel electrode 110 with an organic binder and a solvent. Then, a fuel electrode sheet (a compact for the fuel electrode 110) is formed using the slurry.

Next, a slurry is prepared by mixing a powder (e.g., an YSZ powder) for forming the solid electrolyte layer 120 with water and a binder. Then, a solid electrolyte layer sheet (a compact for the solid electrolyte layer 120) is formed by applying the slurry to the compact for the fuel electrode 110.

Next, thermal treatment is performed on the compacts for the fuel electrode 110 and the solid electrolyte layer 120 to remove the binders, and then the compacts are fired together at 1300 to 1600° C. in an oxygen-containing atmosphere to obtain a co-fired body of the fuel electrode 110 and the solid electrolyte layer 120.

Next, powders (perovskite type oxide powders represented by a general formula $ABO_3$ and containing La and Sr at the A site) for forming the center portion 130a and the outer peripheral portion 130b of the air electrode 130 are prepared. A perovskite type oxide powder that has a larger composition ratio (La/Sr) of La to Sr than the perovskite type oxide powder for forming the center portion 130a is used as the perovskite type oxide powder for forming the outer peripheral portion 130b.

Next, a compact for the center portion 130a is formed by dipping an application liquid, which is obtained by dispersing a center portion material for forming the center portion 130a in a solvent, on a center portion of the solid electrolyte layer 120.

Next, a compact for the outer peripheral portion 130b is formed by dipping an application liquid, which is obtained by dispersing an outer peripheral portion material for forming the outer peripheral portion 130b in a solvent, so as to surround the compact for the center portion 130a.

Next, the compact for the air electrode 130 is fired at 1000 to 1300° C. to form the air electrode 130.

Variations

The embodiment of the present invention has been described, but the present invention is not limited to this embodiment and various alterations can be made without departing from the gist of the present invention.

In the above-described embodiment, the fuel cell 100 is described as one example of the electrochemical cell, but the present invention can also be applied to electrochemical cells such as solid oxide electrolysis cells, as well as fuel cells.

In the above-described embodiment, the fuel cell 100 includes the fuel electrode 110, the solid electrolyte layer 120, and the air electrode 130, but the present invention is not limited to this configuration. For example, the fuel cell 100 may also include a barrier layer for suppressing formation of a high resistivity layer between the solid electrolyte layer 120 and the air electrode 130. The barrier layer can be formed using a ceria-based material including ceria and a solid solution of ceria and a rare earth metal oxide, for example. Examples of such ceria-based materials include GDC (gadolinium doped ceria) and SDC (samarium doped ceria).

EXAMPLES

The following describes examples of fuel cells according to the present invention, but the present invention is not limited to the following examples.

Production of Samples No. 1 to No. 12

Fuel cells according to samples No. 1 to No. 12 were produced as described below.

First, a slurry that was obtained by mixing a blended powder of an NiO powder, a $Y_2O_3$ powder, and a pore forming material (PMMA) with IPA was dried in a nitrogen atmosphere to prepare a mixed powder.

Next, the mixed powder was pressed using a uniaxial press (compacting pressure: 50 MPa) to form a plate having a length of 30 mm, a width of 30 mm, and a thickness of 3 mm, and the plate was further consolidated using a CIP (compacting pressure: 100 MPa) to form a compact for a fuel electrode power collection layer.

Next, a slurry that was obtained by mixing a blended powder of NiO-8YSZ and PMMA with IPA was applied to the compact for the fuel electrode power collection layer to form a compact for a fuel electrode active layer. Thus, a compact for the fuel electrode was obtained.

Next, a slurry for the solid electrolyte layer was prepared by mixing 8YSZ with terpineol and a binder. Then, the slurry for the solid electrolyte layer was applied to the compact for the fuel electrode to form a compact for the solid electrolyte layer.

Next, a GDC slurry was prepared and applied to the compact for the solid electrolyte layer to form a compact for a barrier layer.

Next, the compacts for the fuel electrode, the solid electrolyte layer, and the barrier layer were fired (at 1450° C. for 5 hours) to form a layered body constituted by the fuel electrode, the solid electrolyte layer, and the barrier layer.

Next, a center portion slurry was prepared by mixing a center portion material shown in Table 1 with terpineol and a binder. Then, the center portion slurry was applied to the center of the barrier layer in a circular shape to form a compact for a center portion of the air electrode.

Next, an outer peripheral portion slurry was prepared by mixing an outer peripheral portion material shown in Table 1 with terpineol and a binder. As shown in Table 1, a material that had a larger composition ratio (La/Sr) of La to Sr than the center portion material was used as the outer peripheral portion material. Then, the outer peripheral portion slurry was applied so as to surround the compact for the center portion to form a compact for an outer peripheral portion of the air electrode. Thus, a compact for the air electrode was obtained.

Next, the compact for the air electrode was fired (at 1000° C. for 1 hour) to form the air electrode. The air electrode had a square plane shape having sides with a length of 10 cm.

The plane size of the center portion of the air electrode constituted 50% of the entire plane area of the air electrode.

La/Sr Ratio at Center Portion and Outer Peripheral Portion of Air Electrode

First, middle points of four sides defining an outer edge of the air electrode were determined in a plan view. Next, an intersection point between a straight line connecting middle points of two opposite sides and a straight line connecting middle points of the remaining two opposite sides was determined as the center. Next, with respect to each line segment extending from the center to each middle point, a position located at a distance of ¾ of the entire length of the line segment from the center was determined as a first measurement point (a total of four points) for calculating the first ratio Qb. Also, with respect to each line segment extending from the center to each middle point, a position located at a distance of ¼ of the entire length of the line segment from the center was determined as a second measurement point (a total of four points) for calculating the second ratio Qa.

Next, La intensity data and Sr intensity data were obtained for each of the four first measurement points using a scanning Auger electron spectroscopy apparatus (manufactured by ULVAC-PHI, Inc., Model-710, electron beam acceleration voltage: 10 kV). Next, an La concentration was determined for each first measurement point by dividing the La intensity data by an La relative sensitivity factor (=0.652), and an Sr concentration was determined for each first measurement point by dividing the Sr intensity data by an Sr relative sensitivity factor (=0.059). Next, a mean La concentration was determined by calculating an arithmetic mean of the La concentrations of the four first measurement points, and a mean Sr concentration was determined by calculating an arithmetic mean of the Sr concentrations of the four first measurement points. Then, the first ratio Qb was determined by dividing the mean La concentration by the mean Sr concentration.

Similarly, La intensity data and Sr intensity data were obtained for each of the four second measurement points using the scanning Auger electron spectroscopy apparatus (manufactured by ULVAC-PHI, Inc., Model-710, electron beam acceleration voltage: 10 kV). Next, an La concentration was determined for each second measurement point by dividing the La intensity data by the La relative sensitivity factor (=0.652), and an Sr concentration was determined for each second measurement point by dividing the Sr intensity data by the Sr relative sensitivity factor (=0.059). Next, a mean La concentration was determined by calculating an arithmetic mean of the La concentrations of the four second measurement points, and a mean Sr concentration was determined by calculating an arithmetic mean of the Sr concentrations of the four second measurement points. Then, the second ratio Qa was determined by dividing the mean La concentration by the mean Sr concentration.

Table 1 shows the first ratio Qb, the second ratio Qa, and the ratio of the first ratio Qb to the second ratio Qa.

Durability Test

Each of the samples from No. 1 to No. 12 was heated to 750° C. while supplying a nitrogen gas to the fuel electrode side and supplying air to the air electrode side, and once the temperature reached 750° C., reduction treatment was performed for 3 hours while supplying a hydrogen gas to the fuel electrode.

Thereafter, a voltage drop rate per 1000 hours was measured as a deterioration rate. A value obtained at a temperature of 750° C. and a rated current density of 0.2 A/cm$^2$ was used. Table 1 shows measurement results. In Table 1, samples having a deterioration rate lower than 1.0% are evaluated as "excellent", samples having a deterioration rate of at least 1.0% and lower than 1.1% are evaluated as "good", samples having a deterioration rate of at least 1.1% and lower than 1.2% are evaluated as "fair", and samples having a deterioration rate of at least 1.2% are evaluated as "poor".

TABLE 1

| Sample No. | Center portion material | Outer peripheral portion material | First ratio Qb at outer peripheral portion | Second ratio Qa at center portion | Qb/Qa | Deterioration rate (%) | Evaluation |
| --- | --- | --- | --- | --- | --- | --- | --- |
| 1 | $(La_6, Sr_4)(Co_2, Fe_8)O_3$ | $(La_6, Sr_4)(Co_2, Fe_8)O_3$ | 0.3 | 0.3 | 1.0 | 1.3 | Poor |
| 2 | $(La_{6.2}, Sr_{3.8})(Co_2, Fe_8)O_3$ | $(La_6, Sr_4)(Co_2, Fe_8)O_3$ | 0.33 | 0.3 | 1.1 | 0.9 | Excellent |
| 3 | $(La_{7.2}, Sr_{2.8})(Co_2, Fe_8)O_3$ | $(La_{6.7}, Sr_{3.3})(Co_2, Fe_8)O_3$ | 0.5 | 0.4 | 1.3 | 0.75 | Excellent |
| 4 | $(La_{6.7}, Sr_{3.3})(Co_2, Fe_8)O_3$ | $(La_{5.5}, Sr_{4.5})(Co_2, Fe_8)O_3$ | 0.4 | 0.25 | 1.6 | 1.08 | Good |
| 5 | $(La_{5.5}, Sr_{4.5})(Co_2, Fe_8)O_3$ | $(La_{4.8}, Sr_{5.2})(Co_2, Fe_8)O_3$ | 0.25 | 0.18 | 1.4 | 1.05 | Good |
| 6 | $(La_{7.4}, Sr_{2.6})(Co_2, Fe_8)O_3$ | $(La_{6.7}, Sr_{3.3})(Co_2, Fe_8)O_3$ | 0.55 | 0.4 | 1.4 | 1.0 | Good |
| 7 | $(La_{7.2}, Sr_{2.8})(Co_2, Fe_8)O_3$ | $(La_6, Sr_4)(Co_2, Fe_8)O_3$ | 0.5 | 0.3 | 1.7 | 1.1 | Fair |
| 8 | $(La_{6.4}, Sr_{3.6})FeO_3$ | $(La_{6.4}, Sr_{3.6})FeO_3$ | 0.35 | 0.35 | 1.0 | 1.3 | Poor |
| 9 | $(La_6, Sr_4)FeO_3$ | $(La_{5.5}, Sr_{4.5})FeO_3$ | 0.3 | 0.25 | 1.2 | 0.9 | Excellent |
| 10 | $(La_{7.2}, Sr_{2.8})FeO_3$ | $(La_{6.7}, Sr_{3.3})FeO_3$ | 0.5 | 0.4 | 1.3 | 0.8 | Excellent |
| 11 | $(La_{7.2}, Sr_{2.8})FeO_3$ | $(La_{6.1}, Sr_{3.9})FeO_3$ | 0.5 | 0.32 | 1.6 | 1.05 | Good |
| 12 | $(La_{7.4}, Sr_{2.6})FeO_3$ | $(La_6, Sr_4)FeO_3$ | 0.55 | 0.3 | 1.8 | 1.15 | Fair |

As shown in Table 1, the deterioration rate of the air electrode could be reduced in samples in which the first ratio Qb at the outer peripheral portion was at least 1.1 times the second ratio Qa at the center portion. This is because a reduction in catalyst reaction activity at the center portion could be suppressed as a result of B (boron) being trapped by La contained in the outer peripheral portion.

Also, among the samples in which the first ratio Qb at the outer peripheral portion was at least 1.1 times the second ratio Qa at the center portion, in samples in which the first ratio Qb was not larger than 1.6 times the second ratio Qa, the deterioration rate of the air electrode could be further suppressed. This is because generation of a current density distribution due to a difference in reaction activity between the center portion and the outer peripheral portion could be suppressed during electric conduction, and accordingly local deterioration of the air electrode could be suppressed.

Furthermore, among the samples in which the first ratio Qb at the outer peripheral portion was at least 1.1 times the second ratio Qa at the center portion, in samples in which the first ratio Qb was not larger than 1.3 times the second ratio Qa, the deterioration rate of the air electrode could be further suppressed.

Note that although $SrSO_4$, $Co_3O_4$, CoO, SrO, and the like are known as substances that may cause deterioration of the air electrode, it was confirmed through experiments that the above-described effects can be achieved even if the air electrode contains these substances.

The invention claimed is:

1. An electrochemical cell comprising:
    a fuel electrode;
    an air electrode containing a perovskite type oxide as a main component, the perovskite type oxide being represented by a general formula $ABO_3$ and containing La and Sr at the A site; and
    a solid electrolyte layer arranged between the fuel electrode and the air electrode, wherein
    the air electrode includes a center portion and an outer peripheral portion, the center portion being located at a center of the air electrode in a plane direction perpendicular to a thickness direction of the air electrode, the outer peripheral portion surrounding the center portion in the plane direction, and
    a first ratio of an La concentration to an Sr concentration detected at the outer peripheral portion through Auger electron spectroscopy is at least 1.1 times a second ratio of an La concentration to an Sr concentration detected at the center portion through Auger electron spectroscopy.

2. The electrochemical cell according to claim 1, wherein the first ratio is not larger than 1.6 times the second ratio.

3. The electrochemical cell according to claim 1, wherein the first ratio is not larger than 1.3 times the second ratio.

* * * * *